(12) United States Patent
Ohmura

(10) Patent No.: US 6,272,291 B2
(45) Date of Patent: *Aug. 7, 2001

(54) FOCUS DETECTING DEVICE

(75) Inventor: Yusuke Ohmura, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,656

(22) Filed: Mar. 3, 1999

(30) Foreign Application Priority Data

Mar. 13, 1998 (JP) .................................................. 10-082511
Sep. 11, 1998 (JP) .................................................. 10-276616

(51) Int. Cl.$^7$ ..................................................... G03B 13/36
(52) U.S. Cl. ............................................................. 396/114
(58) Field of Search ................................... 396/111, 112, 396/113, 114

(56) References Cited

U.S. PATENT DOCUMENTS

| | | | |
|---|---|---|---|
| 4,794,416 | * 12/1988 | Mukai et al. | 396/114 |
| 4,992,819 | * 2/1991 | Ohtaka et al. | 396/114 |
| 5,017,005 | * 5/1991 | Shindo | 396/114 |
| 5,049,731 | * 9/1991 | Ishida et al. | 396/111 |
| 5,440,367 | * 8/1995 | Suda | 396/111 |
| 5,546,157 | * 8/1996 | Ohsawa | 396/114 |
| 5,572,013 | * 11/1996 | Ohsawa | 396/114 |
| 5,729,771 | * 3/1998 | Ohtaka | 396/113 |
| 5,822,627 | * 10/1998 | Moriyama | 396/114 |

\* cited by examiner

Primary Examiner—W. B. Perkey
(74) Attorney, Agent, or Firm—Robin, Blecker & Daley

(57) ABSTRACT

A focus detecting device for detecting a focusing state of an objective lens includes a field lens disposed adjacent to a prescribed image forming plane of the objective lens and having lens surfaces which differ in shape from each other correspondingly with a plurality of focus detecting areas, a reimaging lens disposed behind the field lens and having a pair of lens parts for forming a pair of light distributions for each of different pupils of the objective lens, and a light receiving sensor arranged to receive the pair of light distributions so as to detect the focusing state of the objective lens, wherein a first area of the field lens has a first field lens part having an optical axis which coincides with an optical axis of the objective lens, and a second area of the field lens which differs from the first area has a second field lens part having an optical axis which does not coincide with the optical axis of the first field lens part. The focus detecting device is thus compactly arranged and is capable of highly accurately making focus detection for a plurality of focus detecting areas.

10 Claims, 15 Drawing Sheets

FOCUS DETECTING DEVICE

BACKGROUND OF THE INVENTION

1. Field of the Invention

The present invention relates to a focus detecting device adapted for a photographic camera, a video camera and an observation apparatus, or an optical apparatus using the focus detecting device, and more particularly to a focus detecting device arranged to divide the pupil of an objective lens (photographic lens) into a plurality of areas, to obtain a plurality of light distributions relative to an object image by using light fluxes passing through the divided areas and to detect the relative positional relationship of the plurality of light distributions, so that the focusing state of the objective lens can be advantageously detected for a plurality of areas within a photo-taking range.

2. Description of Related Art

Focus detecting devices of a light receiving type called an image-deviation type (phase-difference detecting type) utilizing a light flux passing though an objective lens have been popularly employed as automatic focus detecting devices for photographic cameras, video cameras and the like. Each of these image-deviation type focus detecting devices has optical means arranged on the image-plane side of the objective lens to obtain a plurality of light distributions relative to an object image by using light fluxes passing through the different areas of the pupil of the objective lens. Then, the relative positional relationship of the light distributions is obtained by a photo-electric conversion element composed of a plurality of pixel arrays. The focusing state of the objective lens is thus detected by using signals obtained from the photo-electric conversion element.

Further, some of the focus detecting devices of the image-deviation type area rranged to make a multi-point distance measurement having its distance measuring range cover not only a central area of the viewfinder field, i.e., a photo-taking range, but also some other areas located away from the central area in the vertical or horizontal direction. Each of such multi-point distance measuring focus detecting devices is arranged to have a plurality of focus detecting means, as disclosed, for example, in U.S. Pat. No. 5,005,041.

In the case of such focus detecting devices that are severely required to have a high degree of focusing precision, as in the case of a single-lens reflex camera, an image forming light flux obtained by the objective lens is led to a pair of reimaging lenses. Then, light distributions relative to an object image obtained by the pair of reimaging lenses must be very accurately formed on the pixel arrays of the photo-electric conversion element.

Generally, the arrangement for setting the distance measuring (focus detecting) areas not only in a central area of the photo-taking range but also in other areas located vertically and horizontally away from the central area necessitates use of many focus detecting members. The increase in number of focus detecting members incurs an increase in size of the focus detecting device. Particularly, the increase in size of a sensor chip used for forming the pixel arrays of the photo-electric conversion element causes an increase in cost.

Further, in the arrangement having a plurality of focusing detecting means, images formed on the sensor chip by reimaging lenses include not only images required for focus detection but also as many images as the product of the number of reimaging lenses and the number of focus detecting areas. That arrangement thus results in a drop in focus detecting accuracy caused by unnecessary light or in a further increase in size of the apparatus for eliminating the unnecessary light.

BRIEF SUMMARY OF THE INVENTION

It is an object of the invention to provide a focus detecting device which is arranged to be capable of accurately detecting a focusing state of each of a plurality of focus detecting areas located in vertical and horizontal directions within a photo-taking field, by appositely setting the various optical elements of focus detecting optical means disposed on the image-plane side of an objective lens (photo-taking lens), or an optical apparatus using the focus detecting device.

To attain the above object, in accordance with an aspect of the invention, there is provided a focus detecting device for detecting a focusing state of an objective lens, which comprises a field lens disposed adjacent to a prescribed image forming plane of the objective lens and having lens surfaces which differ in shape from each other correspondingly with a plurality of focus detecting areas, a reimaging lens disposed behind the field lens and having a pair of lens parts for forming a pair of light distributions for each of different pupils of the objective lens, and a light receiving sensor arranged to receive the pair of light distributions so as to detect the focusing state of the objective lens, wherein a first area of the field lens has a first field lens part having an optical axis which coincides with an optical axis of the objective lens, and a second area of the field lens which differs from the first area has a second field lens part having an optical axis which does not coincide with the optical axis of the first field lens part.

Further, in accordance with another aspect of the invention, there is provided a focus detecting device for detecting a focusing state of an objective lens, which comprises a field lens disposed adjacent to a prescribed image forming plane of the objective lens and having lens surfaces which differ in shape from each other correspondingly with a plurality of focus detecting areas, a reimaging lens disposed behind the field lens and having a pair of lens parts for forming a pair of light distributions for each of different pupils of the objective lens, and a light receiving sensor arranged to receive the pair of light distributions so as to detect the focusing state of the objective lens, wherein the plurality of focus detecting areas include first and second focus detecting areas which orthogonally intersect each other and a third focus detecting area which is disposed in parallel with and away from the first focus detecting area, the field lens includes a first field lens part which corresponds to the first and second focus detecting areas in common and a second field lens part which corresponds to the third focus detecting area, the reimaging lens includes a pair of first lens parts arranged to receive light from the first and third focus detecting areas and a pair of second lens parts arranged to receive light from the second focus detecting area, and a lens surface, on the side of the light receiving sensor, of each of the first lens parts of the reimaging lens has a curved surface convex toward the light receiving sensor.

The above and further objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
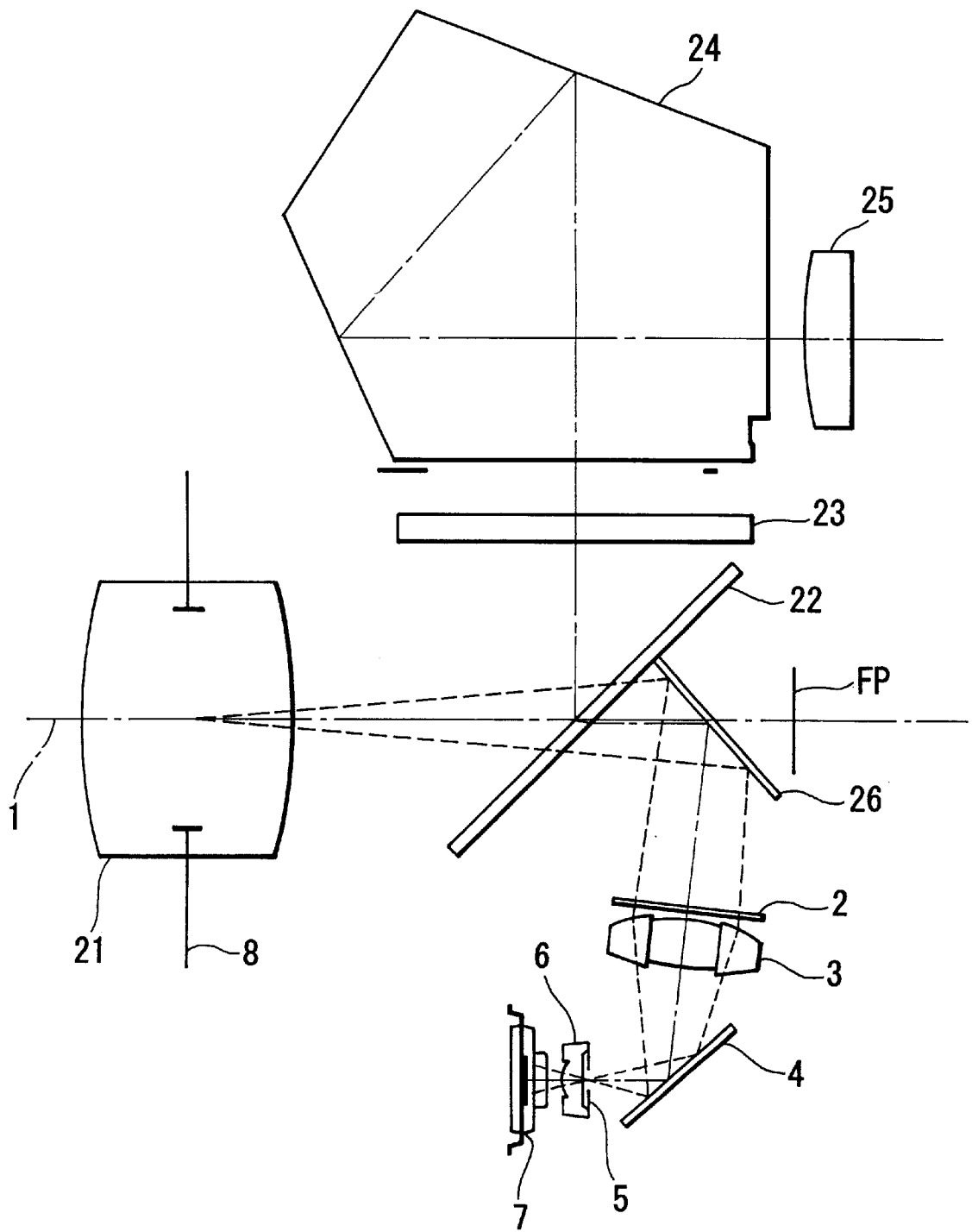
FIG. 1 schematically shows essential parts of a camera having a focus detecting device according to a first embodiment of the invention.
Figure 2:
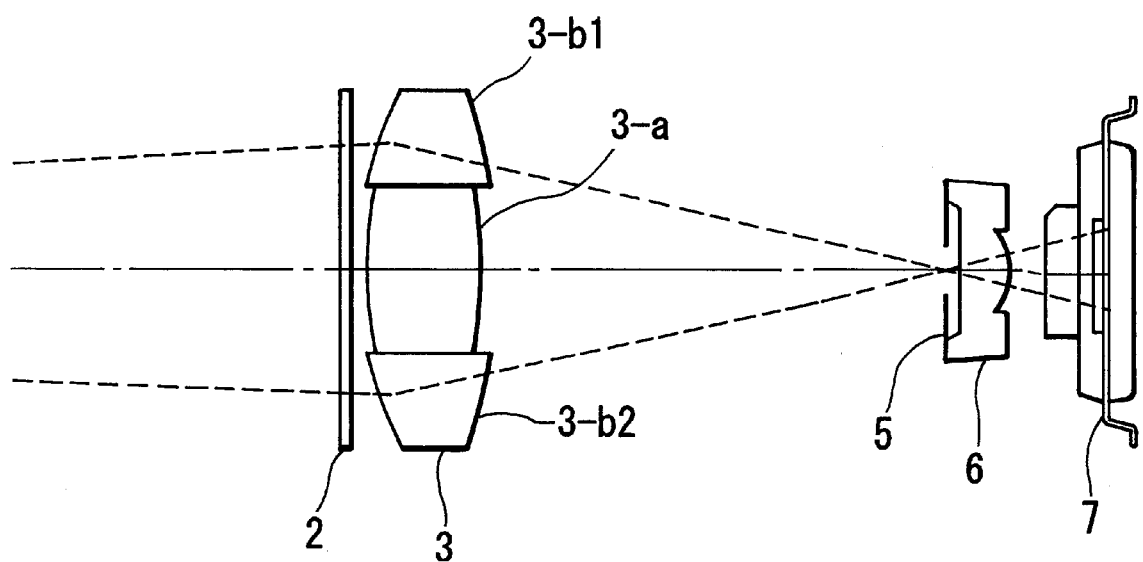
FIG. 2 is an enlarged view showing in part the arrangement of the focus detecting device shown in FIG. 1.

FIG. 1 schematically shows essential parts of an optical apparatus such as a camera or the like having a focus detecting device according to a first embodiment of the invention. FIG. 2 schematically shows main parts of an optical system included in the focus detecting device shown in FIG. 1.

Referring to FIGS. 1 and 2, reference numeral 21 denotes an objective lens, i.e., a photographic lens, arranged to be detachably attached to a camera body (not shown). Reference numeral 1 denotes an optical axis 1 of the objective lens 21, reference numeral 8 denotes a pupil plane of the objective lens 21, reference character FP denotes a film, i.e., an image-taking plane, reference numeral 22 denotes a main mirror which is semitransparent and is arranged on the optical axis 1 of the objective lens 21, reference numeral 23 denotes a focusing screen which is arranged to have an object image obtained by the objective lens 21 formed thereon through the main mirror 22, reference numeral 24 denotes a pentagonal prism, and reference numeral 25 denotes an eyepiece lens which is arranged to permit viewing the object image formed on the focusing screen 23.

A first reflecting mirror 26 (sub-mirror) is obliquely disposed on the optical axis 1 on the image-plane side of the objective lens 21.

Figure 3:
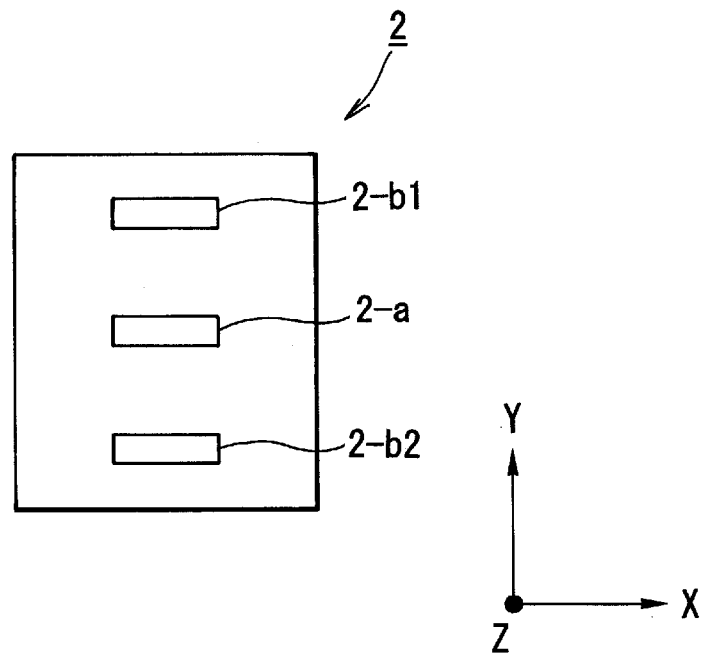
FIG. 3 shows in detail a field mask included in the camera shown in FIG. 1.

A field mask 2 is disposed adjacent to the focal plane of the objective lens 21. FIG. 3 is a front view of the field mask 2. As shown in FIG. 3, the field mask 2 is provided with three openings 2-*a*, 2-*b*1 and 2-*b*2 and is arranged to have a focus detecting field which transversely extends, i.e., in the direction of arrow X. The longitudinal direction of the focus detecting field (X direction) is perpendicular to the paper surface of the drawing of FIG. 2. The three openings 2-*a*, 2-*b*1 and 2-*b*2 are arranged in the vertical direction as viewed in FIG. 2, i.e., in the direction of arrow Y, as shown in FIG. 3.

Figure 4:
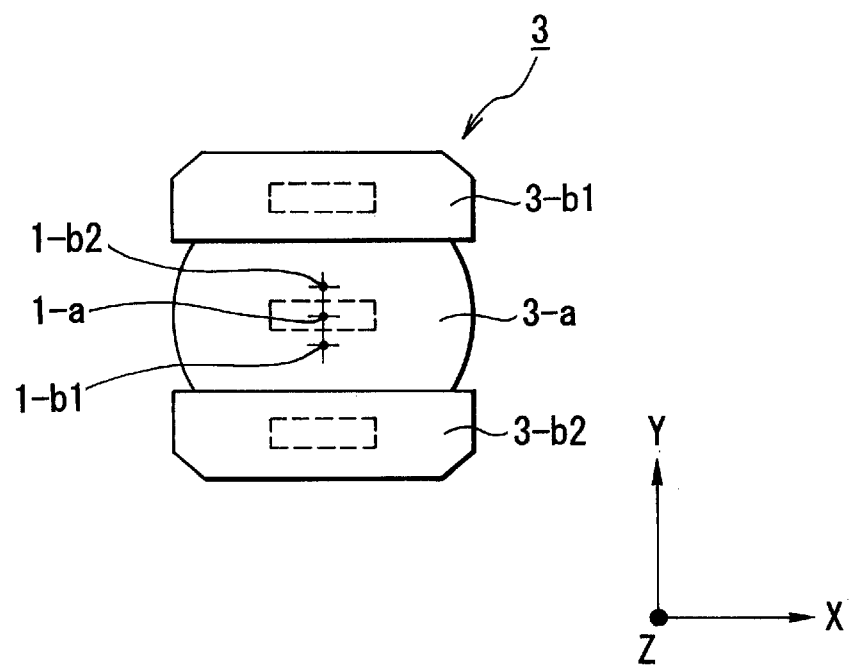
FIG. 4 shows in detail a field lens included in the camera shown in FIG. 1.

A field lens 3 is divided into three lens parts 3-*a*, 3-*b*1 and 3-*b*2 and is disposed in the neighborhood of the field mask 2 a little away from the focal plane of the objective lens 21. FIG. 4 is a front view of the field lens 3. The three lens parts 3-*a*, 3-*b*1 and 3-*b*2 of the field lens 3 are arranged to differ in focal length. When the focal lengths of the lens parts 3-*a*, 3-*b*1 and 3-*b*2 are assumed to be fa, fb1 and fb2, respectively, the following condition is satisfied:

$$fa < fb1 = fb2$$

Figure 5:
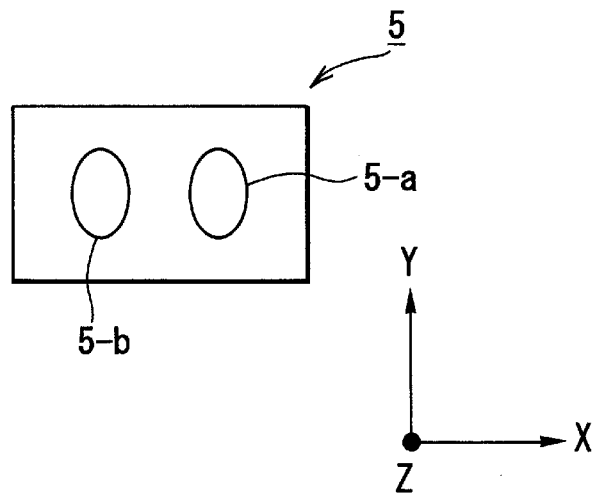
FIG. 5 shows in detail a diaphragm included in the camera shown in FIG. 1.

Reference numeral 5 denotes a diaphragm of the focus detecting device. FIG. 5 is a front view of the diaphragm 5. Referring to FIG. 5, the diaphragm 5 has two aperture parts 5-*a* and 5-*b* which are arranged to correspond to two lens parts 6-*a* and 6-*b* of a reimaging lens 6. The reimaging lens 6, which is provided with the two lens parts 6-*a* and 6-*b*, has the function of forming the image of the objective lens 21 again on a photo-electric conversion element 7 through the openings 2-*a*, 2-*b*1 and 2-*b*2 of the field mask 2.

Figure 6A:
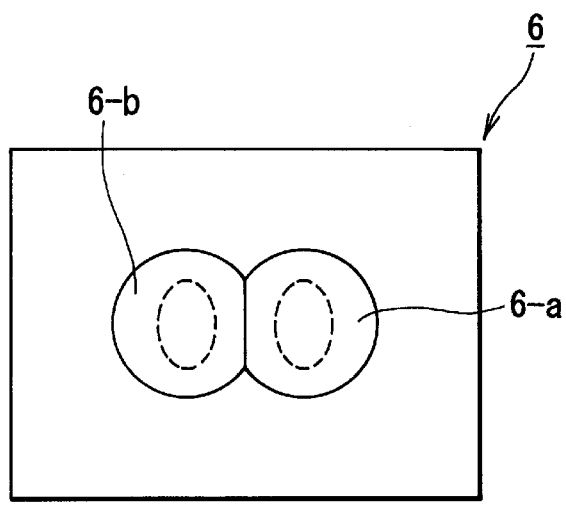
FIGS. 6(A) and 6(B) are front and side views showing a reimaging lens (secondary image forming lens) included in the camera shown in FIG. 1.
Figure 6B:
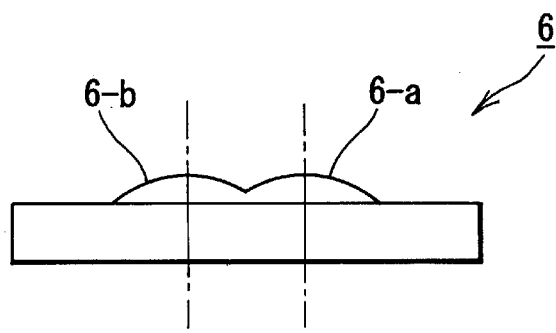

FIGS. 6(A) and 6(B) show the reimaging lens 6 respectively in a front view and a side view. The apexes of the two lens parts 6-*a* and 6-*b* of the reimaging lens 6 are juxtaposed in a direction perpendicular to the paper surface of the drawing of FIG. 2, i.e., in the direction of X. Reference numeral 7 denotes the photo-electric conversion element mentioned above.

Figure 7:
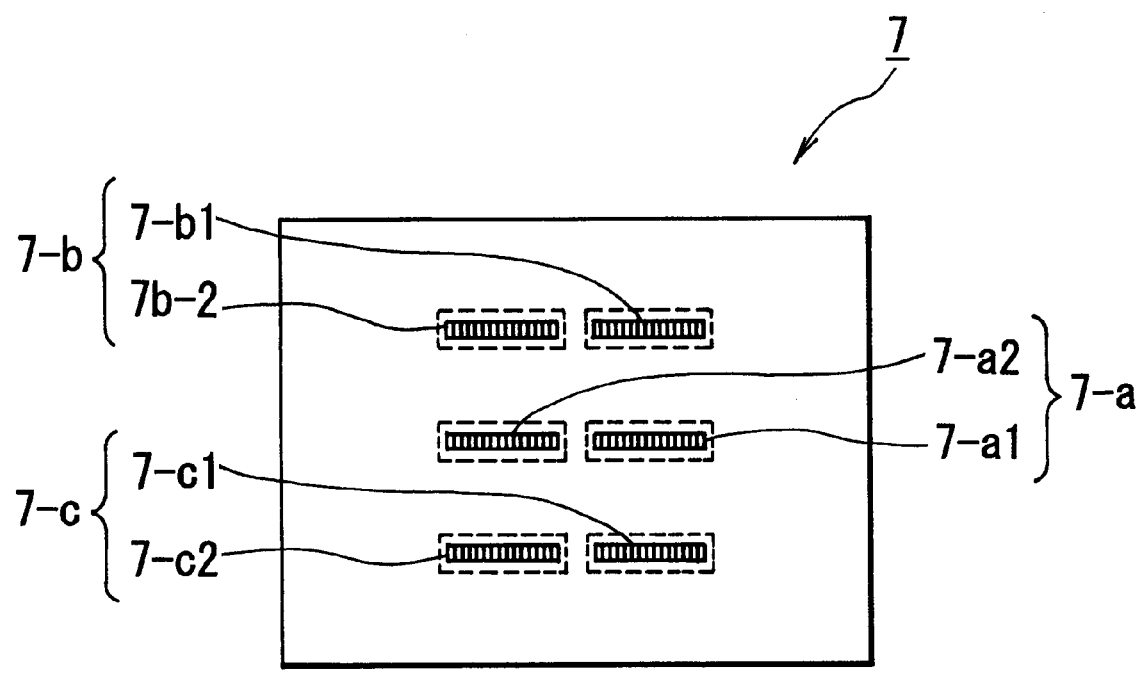
FIG. 7 shows in detail a photo-electric conversion element included in the camera shown in FIG.
Figure 7:
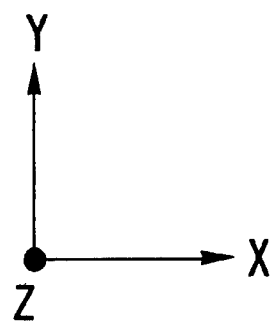

FIG. 7 is a front view of the photo-electric conversion element 7. As shown in FIG. 7, the photoelectric conversion element 7 includes light receiving parts 7-*a*, 7-*b* and 7-*c*, each of which is composed of a pair of sensor arrays. The longitudinal direction (X direction) of each sensor array corresponds to the direction perpendicular to the paper surface of the drawing of FIG. 2 (X direction).

Light fluxes passing through the openings 2-*a*, 2-*b*1 and 2-*b*2 of the field mask 2 come through the lens parts 3-*a*, 3-*b*1 and 3-*b*2 of the field lens 3, the diaphragm 5 and the reimaging lens 6 to form, on the light receiving parts 7-*a*, 7-*b* and 7-*c* of the photoelectric conversion element 7, a secondary image of the object image obtained by the objective lens 21.

As shown in FIG. 7, each of the light receiving parts 7-*a*, 7-*b* and 7-*c* of the photo-electric conversion element 7 includes a pair of pixel arrays composed of a great number of pixels. Light flux images obtained respectively through the openings 2-*a*, 2-*b*1 and 2-*b*2 of the field mask 2 are projected onto the respective areas of the photo-electric conversion element 7 indicated by broken lines encompassing the pixel arrays in FIG. 7. As a result, a secondary image of the object is formed within each of the areas.

For each of the openings of the field mask 2, two secondary images are caused by the reimaging lens 6 which is composed of a pair of lens parts (lens parts 6-*a* and 6-*b*) to be formed longitudinally in a state of being juxtaposed in the X direction, which is perpendicular to the paper surface of drawing of FIG. 2. The positions of the secondary object images thus formed shift longitudinally (in the X direction) according to the focusing state of the objective lens 21.

The pairs of pixel arrays of the light receiving parts 7-*a*, 7*b* and 7*c* are arranged to permit detection of relative distances of the secondary images on the photoelectric conversion element 7 for the images formed by the light fluxes passing through the corresponding openings 2-*a*, 2-*b*1 and 2-*b*2 of the field mask 2. By detecting the relative distances, the focus adjusting state of the objective lens 21 is detected for each of the openings 2-*a*, 2-*b*1 and 2-*b*2 of the field mask 2.

The action of the field lens 3 which is composed of the three divided lens parts arranged to have different focal lengths according to the arrangement of the first embodiment is next described as follows. The role to be played by the field lens 3 is to interconnect the exit pupil 8 of the objective lens 21 which is the object of focus detection and the diaphragm 5 of the focus detecting device in a conjugate relation to each other.

In other words, the diaphragm 5 of the focus detecting device is so set as to be projected onto the exit pupil 8 of the objective lens 21. This means that an image of the diaphragm 5 projected by the field lens 3 is formed at the position of the exit pupil 8 of the objective lens 21.

Figure 8A:
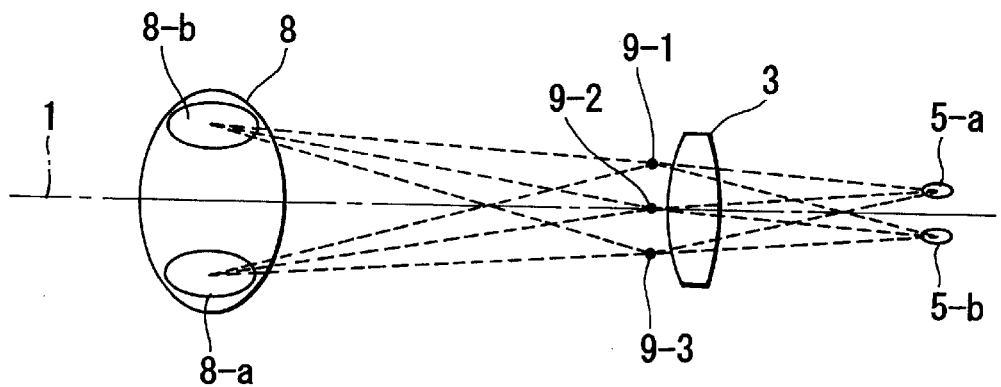
FIGS. 8(A), 8(B) and 8(C) show enlarged details of a part of the camera shown in FIG. 1.

FIG. 8(A) shows a case where the focal length of the field lens 3 is appositely set so that projected images of the aperture parts 5-*a* and 5-*b* of the diaphragm 5 are formed on the exit pupil 8 of the objective lens 21.

Therefore, all light fluxes passing through the image positions of the objective lens 21 represented by linearly-aligned points 9-1, 9-2 and 9-3 which form one focus detecting area are completely taken in the focus detecting device.

Figure 8B:
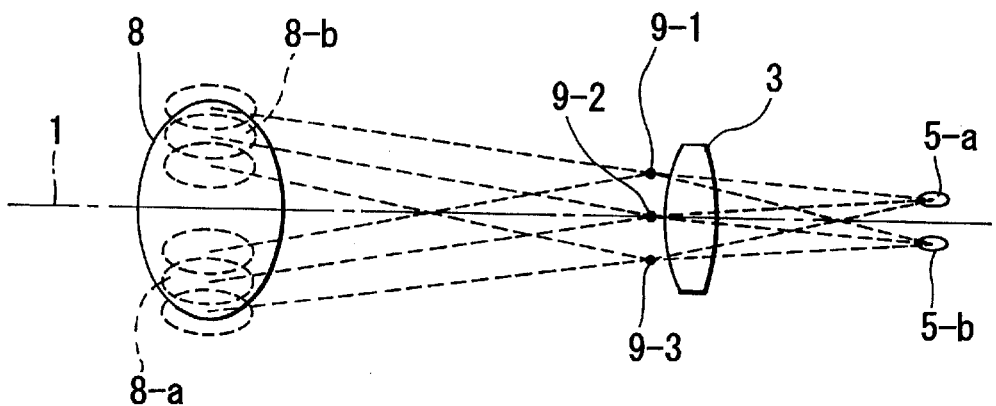
Figure 8C:
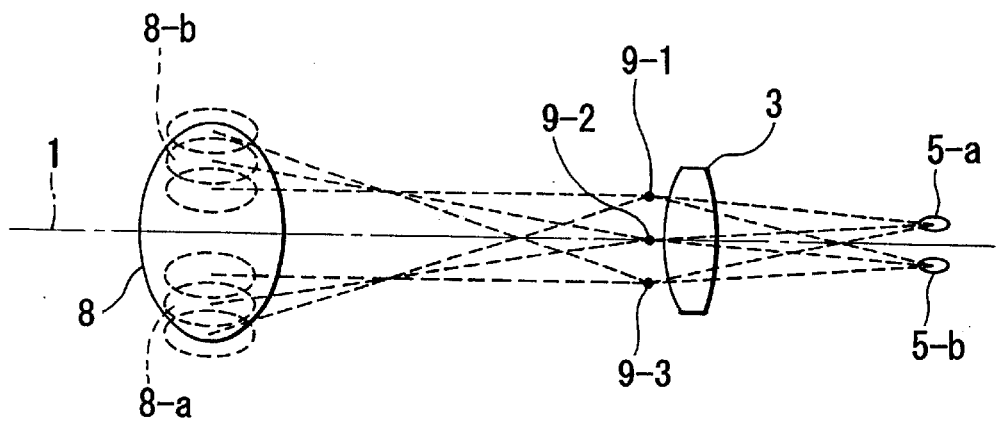

FIGS. 8(B) and 8(C), on the other hand, show cases where the focal lengths of the field lens 3 are not appositely set. In these cases, therefore, the images of the aperture parts 5-*a* and 5-*b* of the diaphragm 5 projected by the field lens 3 are not formed on the exit pupil 8 of the objective lens 21.

In the case of FIG. 8(B), the focal length of the field lens 3 is too long. Therefore, the projected images of the aperture parts 5-*a* and 5-*b* of the diaphragm 5 fail to converge.

In the case of FIG. 8(C), the focal length of the field lens 3 is too short to cause the projected images of the aperture parts 5-*a* and 5-*b* of the diaphragm 5 to converge. Therefore, light fluxes passing through the image positions 9-1 and 9-3 of the objective lens 21 are eclipsed by the exit pupil 8 of the objective lens 21 to become a light distribution on the photo-electric conversion element 7. Since this light distribution is irrelevant to the object and is detrimental to focus detection, the accuracy of focus detection would be greatly affected by the light distribution.

Therefore, the focal length of the field lens 3 must be appositely set to prevent the projected images of the diaphragm 5 from blurring in the direction of separating the two aperture parts of the diaphragm 5, i.e., for the image height in the longitudinal direction of the focus detecting area.

On the other hand, the arrangement for detecting focus for a plurality of focus detecting areas with a pair of aperture parts of the diaphragm 5, as in the case of the first embodiment, makes it necessary to appositely set focal lengths not only for the projected images of the diaphragm 5 on the exit pupil in the longitudinal direction of the focus detecting areas, as mentioned above, but also for images projected in the directions in which the plurality of focus detecting areas are separated from each other.

Figure 9A:
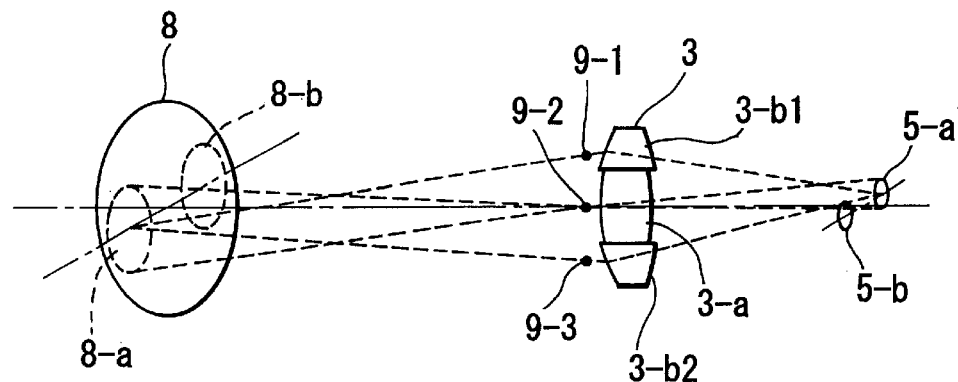
FIGS. 9(A), 9(B) and 9(C) show enlarged details of a part of the camera shown in FIG. 1.
Figure 9B:
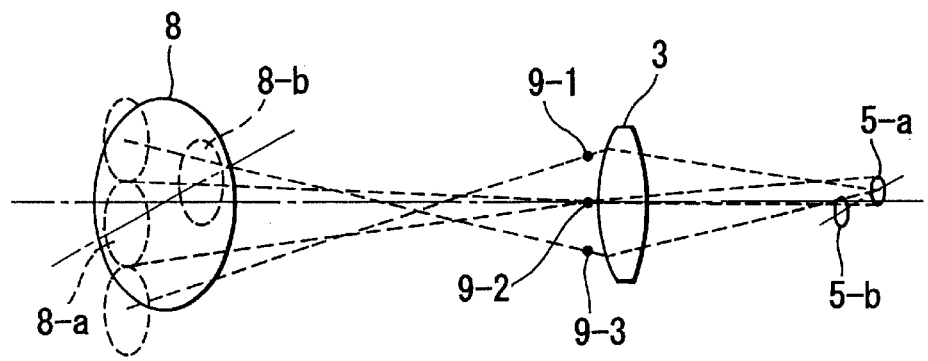

FIG. 9(B) shows a case where the field lens 3 which is set for a central field indicated by a point 9-2 is used also for fields vertically divided as indicated by points 9-1 and 9-3. In this case, the focal length is too short for the fields 9-1 and 9-3. As a result, the projected images of the aperture parts 5-*a* and 5-*b* of the diaphragm 5 are eclipsed and caused to be projected outside of the exist pupil 8 of the objective lens 21.

Figure 9C:
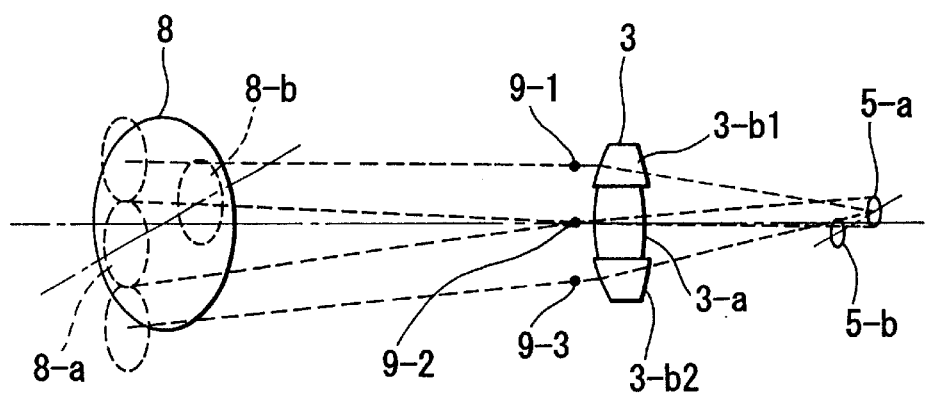

FIG. 9(C) shows a case where the field lens 3 is divided for different fields, and lens parts 3-*b*1 and 3-*b*2 corresponding to vertically divided fields indicated by the points 9-1 and 9-3 are optimized for images projected in the longitudinal direction. For the fields 9-1 and 9-3, however, the focal lengths of the field lens 3 are too long, so that the projected images of the aperture parts 5-*a* and 5-*b* of the diaphragm 5 are eclipsed to be projected outside of the exit pupil 8 of the objective lens 21.

FIG. 9(A) shows a case where focus detecting areas extending respectively in a direction perpendicular to the paper surface of the drawing are set at points 91, 9-2 and 9-3 in the neighborhood of the field lens 3. The aperture parts 5-*a* and 5-*b* of the diaphragm 5 are used in common for these fields. Assuming that the divided lens parts 3-*a*, 3-*b*1 and 3-*b*2 of the field lens 3 respectively have focal lengths fa, fb1 and fb2, each of the focal lengths fb1 and fb2 is set to be longer than the focal length fa. The optical axes of the lens parts 3-*b*1 and 3-*b*2 having the focal lengths fb1 and fb2 are arranged to be decentered as indicated by points 1-*b*1 and 1-*b*2 in FIG. 4. By this arrangement, projected images in the field dividing direction (vertical direction as viewed in the drawing) and in the longitudinal direction of the field (diaphragm dividing direction) can be adequately projected onto the exit pupil 8 of the objective lens 21. This arrangement permits adequate focus detection for every field at every image height without causing any eclipse of the pupil.

Figure 10:
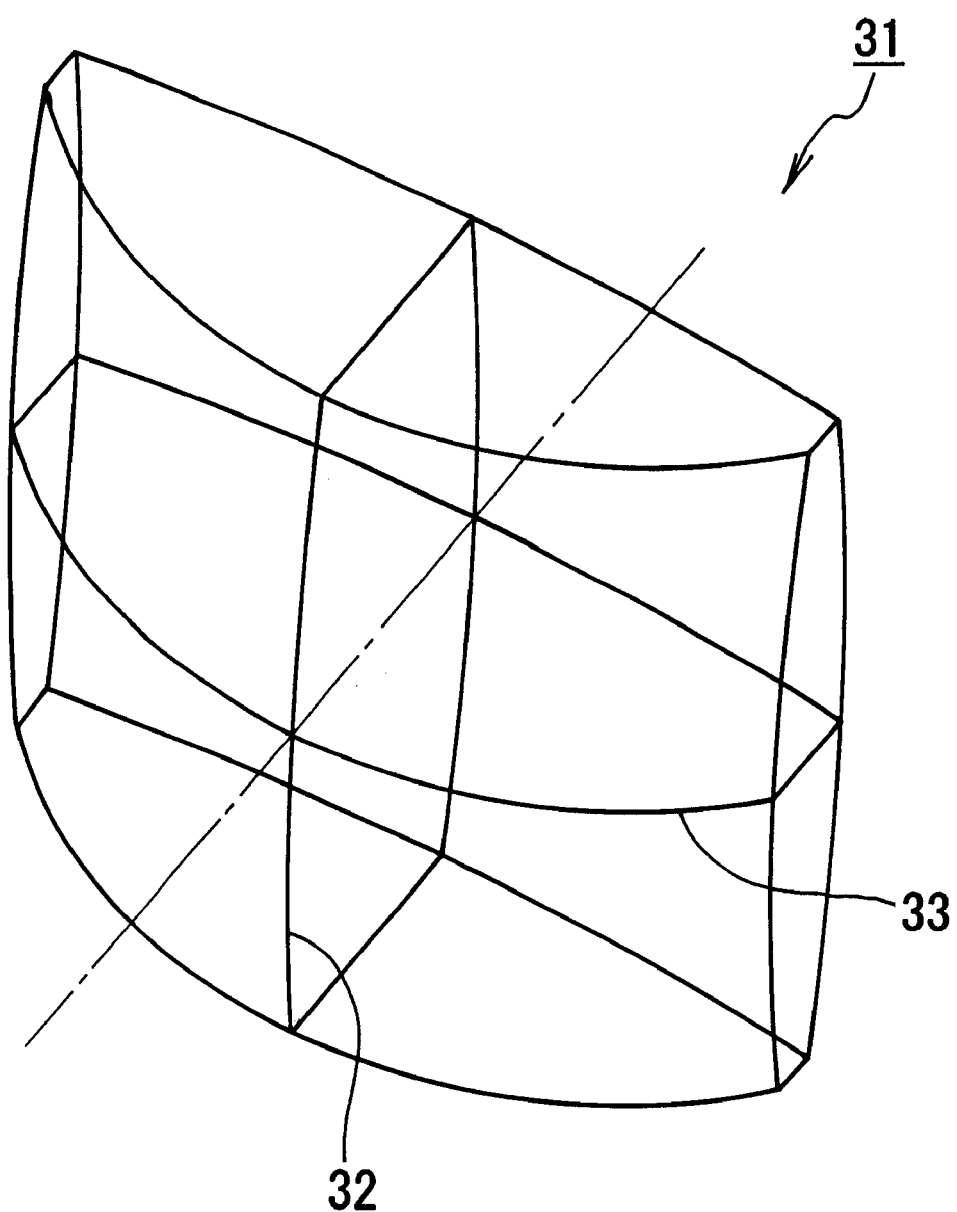
FIG. 10 shows a part of a focus detecting device according to a second embodiment of the invention.

FIG. 10 shows a part of a focus detecting device according to a second embodiment of the invention. A feature of the second embodiment lies in that the field lens 3 in the first embodiment is replaced with an aspheric lens as shown in FIG. 10. In other words, a toric aspheric lens 31 in which the refractive power of its central part differs from that of its peripheral part.

In FIG. 10, reference numerals 32 and 33 denote a generatrix and a meridian, respectively, and the aspheric lens 31 is schematically shown to make it readily understandable. The generatrix 32 has a larger radius of curvature than the meridian 33. With the toric aspheric lens of a one-body shape having different radii of curvature for the generatrix 32 and the meridian 33 used, the field lens is set to have different powers in the field dividing direction which is vertical as viewed in the drawing and in the longitudinal direction of the field (the diaphragm dividing direction) which is perpendicular to the paper surface of the drawing, as in the case of the field lens 3 shown in FIGS. 9(A) to 9(C). This arrangement of the second embodiment enables the projected images of the aperture parts 5-a and 5-b of the diaphragm 5 to be adequately projected onto the exit pupil 8 of the objective lens 21 in the same manner as in the case of the first embodiment described above.

According to the arrangement of each of the first and second embodiments, a focus detecting device, or an optical apparatus using the focus detecting device, can be arranged to be capable of highly accurately detecting focusing states of each of a plurality of focus detecting areas located in the vertical and horizontal directions, within a photo-taking field, by appositely setting the various optical elements of the focus detecting optical means disposed on the image-plane side of the objective lens (photographic lens).

It is a particularly advantageous feature of each of the first and second embodiments that the focusing states of a plurality of areas can be detected by means of a secondary image forming lens composed of a pair of lens parts, so that the focus detecting device can be compactly arranged at low cost to have a high rate of performance.

A third embodiment of the invention is arranged to have focus detecting areas in a crossed state. That arrangement permits a distance measuring (focus detecting) action to be adequately carried out on objects having patterns of vertical or horizontal stripes. The basic structural arrangement of the third embodiment is similar to that of the first embodiment shown in FIGS. 1 and 2. The following description of the third embodiment is, therefore, limited to points where the third embodiment differs from the first embodiment.

Figure 11:
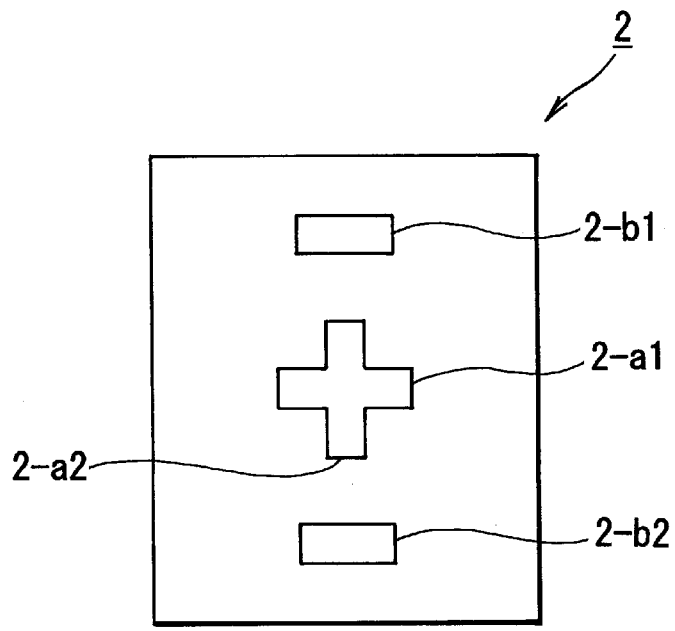
FIG. 11 shows a field mask of a focus detecting device according to a third embodiment of the invention.

FIG. 11 is a front view showing the field mask 2 of a focus detecting device according to the third embodiment of the invention. The field mask 2 has four openings to give three focus detecting areas 2-a1, 2-b1 and 2-b2 each of which laterally extends and one focus detecting area 2-a2 which vertically extends to cross the focus detecting area 2-a1 in the central part of the field mask 2.

Here, the focus detecting area 2-a1 represents a first focus detecting area, the focus detecting area 2-a2 represents a second focus detecting area, and each of the focus detecting areas 2-b1 and 2-b2 represents a third focus detecting area.

The longitudinal direction in the field of each of the focus detecting areas 2-a1, 2-b1 and 2-b2 is a direction which is perpendicular to the paper surface of the drawing of FIG. 2. In the vertical direction as viewed in FIG. 2, the three of the openings of the field mask 2 are arranged. The length of each of the focus detecting areas 2-b1 and 2-b2 is shorter than that of the focus detecting area 2-a1.

Figure 12:
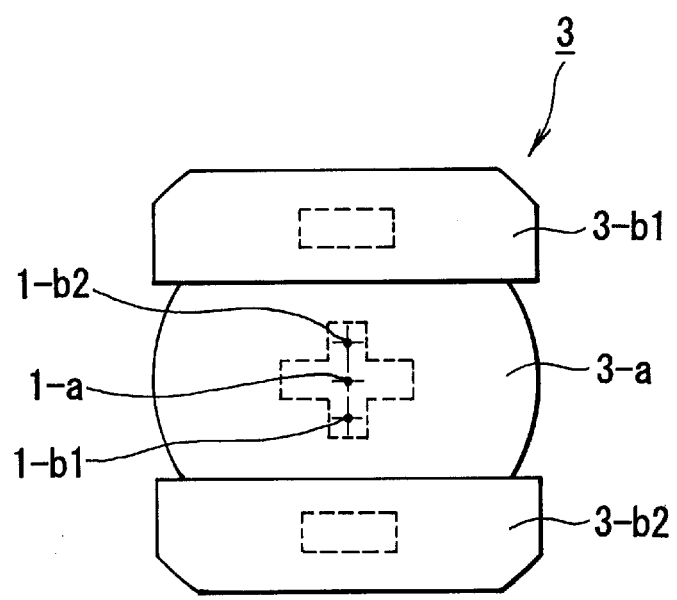
FIG. 12 shows in detail a field lens included in the third embodiment of the invention.

FIG. 12 is a front view of a field lens 3 which is disposed in the neighborhood of the field mask 2 a little away from the focal plane of the objective lens 21. The field lens 3 is composed of a first lens part 3a and second lens parts 3-b1 and 3-b2. Assuming that the focal lengths of the lens parts 3-a, 3-b1 and 3-b2 are fa, fb1 and fb2, respectively, the field lens 3 must be arranged to satisfy the following relation:

$$fa < fb1 = fb2$$

Figure 13:
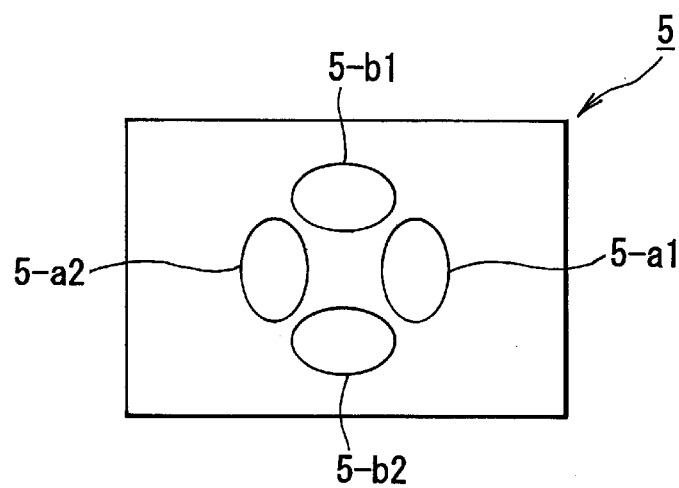
FIG. 13 shows in detail a diaphragm mask included in the third embodiment.

FIG. 13 is a front view of a diaphragm 5 in the third embodiment. The diaphragm 5 has four aperture parts 5-a1, 5-a2, 5-b1 and 5-b2 which are arranged to constitute two pairs of aperture parts corresponding to a reimaging lens 6 which also has two pairs of lens parts.

The reimaging lens 6, which has two pairs of lens parts, is arranged to form the image of the objective lens 21 again on a photo-electric conversion element (light receiving means) 7 through the openings of the field mask 2.

Figure 14A:
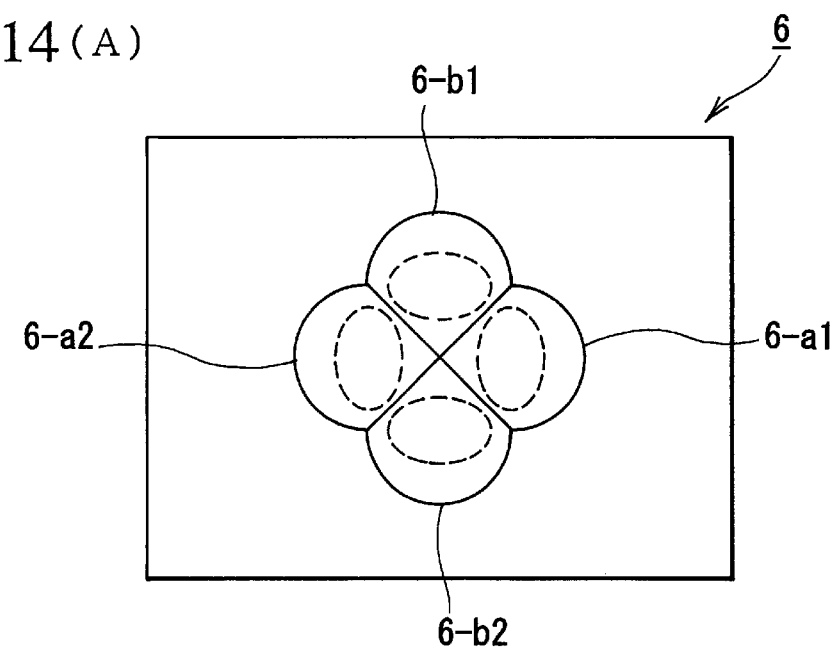
FIGS. 14(A) and 14(B) show in detail a reimaging lens included in the third embodiment.
Figure 14B:
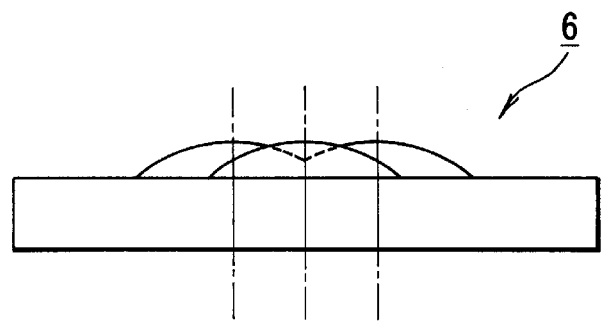

FIGS. 14(A) and 14(B) are front and side views of the reimaging lens 6, respectively, in the third embodiment. As shown in FIGS. 14(A) and 14(B), the reimaging lens 6 has lens parts 6-a1, 6-a2, 6-b1 and 6-b2 which are arranged to constitute two pairs of lens parts.

Figure 15:
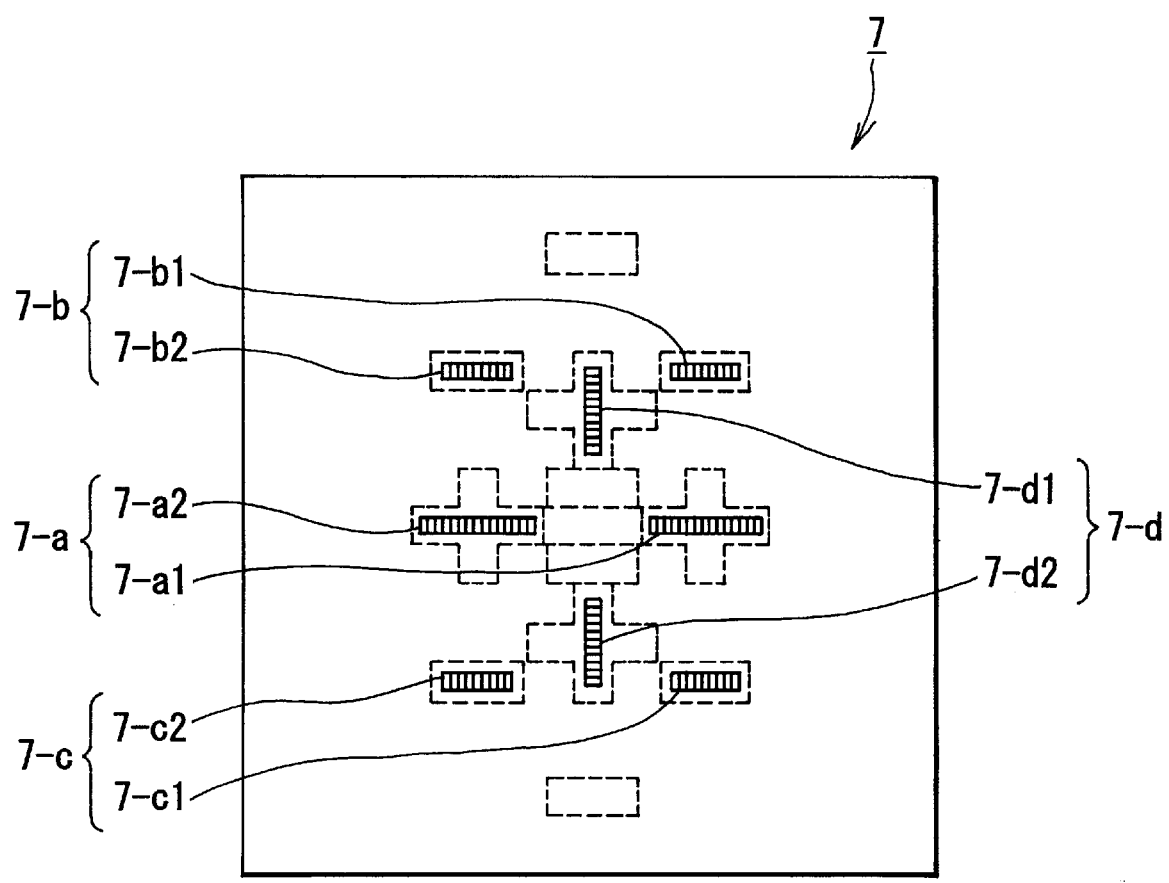
FIG. 15 shows in detail a photo-electric conversion element included in the third embodiment.

FIG. 15 is a front view of the photo-electric conversion element 7 in the third embodiment. The longitudinal direction of alignment of pixel arrays 7-a, 7-b and 7-c corresponds to a direction which is perpendicular to the paper surface of the drawing of FIG. 2.

Light fluxes passing through the openings 2-a1, 2-a2, 2-b1 and 2-b2 of the field mask 2 pass through the lens parts 3-a, 3-b1 and 3-b2 of the field lens 3 to form on the photo-electric conversion element 7 secondary images of an object image obtained by the objective lens 21.

FIG. 15 shows how the secondary images are formed. Each of the pairs of pixel arrays 7-a, 7-b, 7-c and 7-d are composed of a great number of pixels. The images of the openings 2-a1, 2-a2, 2-b1 and 2-b2 of the field mask 2 are projected onto the areas of such pixel arrays encompassed with broken lines, as shown in FIG. 15, to form secondary images of the object image within the respective areas.

As shown by the broken lines in FIG. 15, four secondary images are formed, for one opening of the field mask 2, by the reimaging lens 6 composed of two pairs of lens parts (lens parts 6-a1, 6-a2, 6-b1 and 6-b2). The positions of the secondary images of the object image shift in the longitudinal direction of the pixel arrays according to the focus adjusting state (focusing state) of the objective lens 21.

The pairs of the pixel arrays 7-a, 7-b, 7-c and 7-d are arranged to permit detection of the relative distances of the secondary images on the photo-electric conversion element 7 for the images of the light fluxes passing through the corresponding openings of the field mask 2. With the relative distances of the secondary images thus detected, the focus adjusting state of the objective lens 21 can be detected for each of the openings of the field mask 2.

The action of the field lens 3 which is composed of three divided lens parts of different focal lengths is next described. The role to be played by the field lens 3 of the focus detecting device is to interconnect the exit pupil 8 of the objective lens 21 and the diaphragm 5 in a conjugate relation.

In other words, the diaphragm 5 of the focus detecting device is so set to be projected onto the exit pupil 8 of the objective lens 21.

Figure 16:
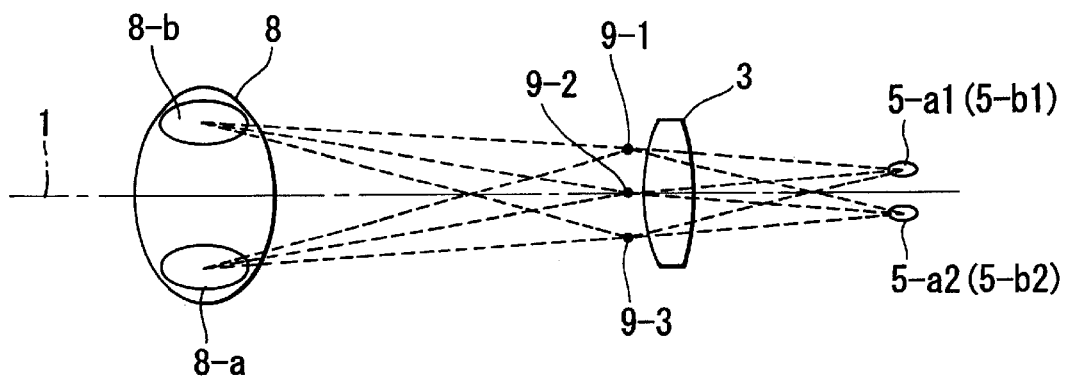
FIG. 16 shows how a pupil image is formed in the longitudinal direction of a field of view in the third embodiment.

FIG. 16 shows a case where the focal lengths of the field lens 3 are appositely set, so that the projected images of the aperture parts 5-a1 and 5-a2 (5-b1 and 5-b2) are imaged on the exit pupil 8 of the objective lens 21.

Therefore, all light fluxes passing through the image of the objective lens 21 indicated by points 9-1, 92 and 9-3 which are linearly aligned to form one focus detecting area are completely taken in the focus detecting device.

Figure 17:
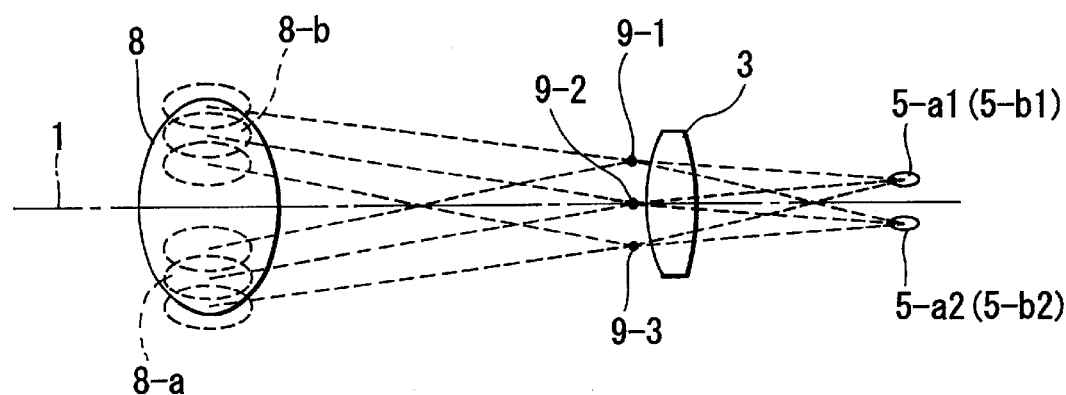
FIG. 17 shows how a pupil image is formed in the longitudinal direction of a field of view in the third embodiment.
Figure 18:
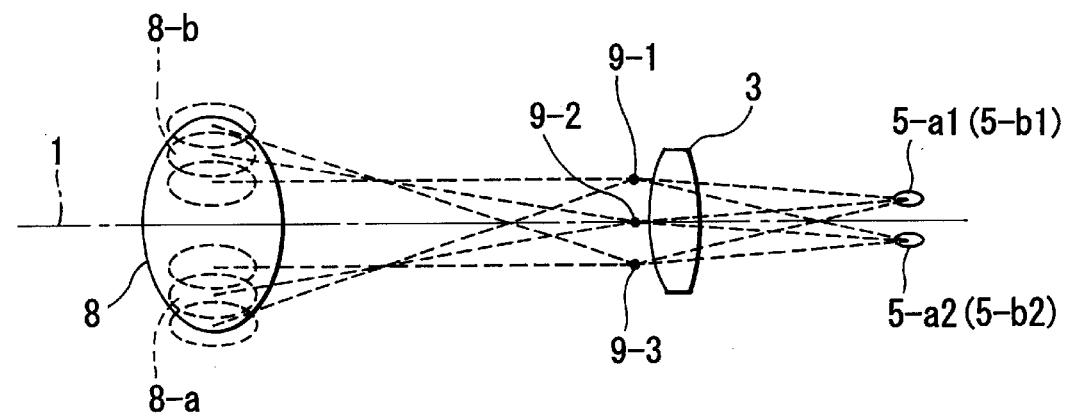
FIG. 18 shows how a pupil image is formed in the longitudinal direction of a field of view in the third embodiment.

FIGS. 17 and 18, on the other hand, show cases where the focal lengths of the field lens 3 are not appositely set. In these cases, therefore, the projected images by the field lens 3 of the aperture parts 5-a1 and 5-a2 (5-b1 and 5-b2) fail to be formed on the exist pupil 8 of the objective lens 21.

The focal length of the field lens 3 is too long in the case of FIG. 17 and too short in the case of FIG. 18. In both of these cases, therefore, the projected images of the aperture parts 5-a1 and 5-a2 (5-b1 and 5-b2) of the diaphragm 5 fail to converge. Light fluxes passing through the image positions 9-1 and 9-3 of the objective lens 21 are eclipsed by the exit pupil 8 of the objective lens 21 to become light distributions on the photo-electric conversion element 7 of the focus detecting device. The light distributions which are irrelative to the object are greatly detrimental to the focus detection and result in some focus detection errors.

Therefore, the focal length of the field lens 3 must be appositely set to prevent the projected images of the diaphragm 5 from blurring in the direction of separating the pair of aperture parts of the diaphragm 5, i.e., for the image height in the longitudinal direction of the focus detecting area.

The arrangement for detecting focus for a plurality of focus detecting areas with a pair of aperture parts of a diaphragm, as in the case of the third embodiment, makes it necessary to appositely set focal lengths not only for projected images of the diaphragm on the exist pupil in the longitudinal direction of the focus detecting areas, as mentioned above, but also for the directions in which the plurality of focus detecting areas are separated from each other.

Figure 20:
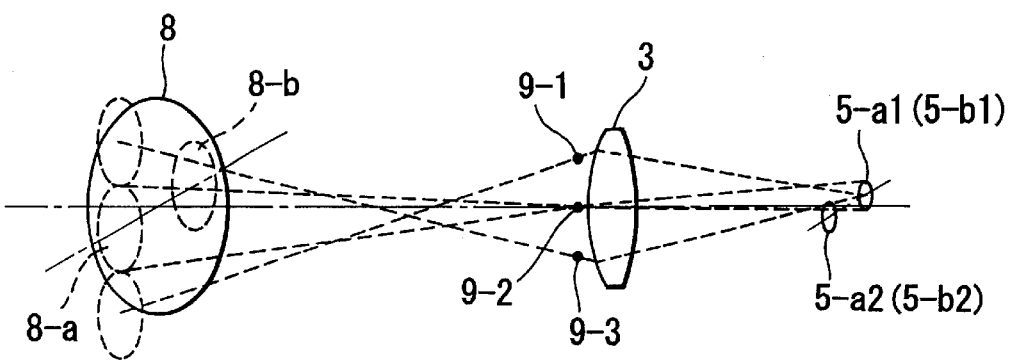
FIG. 20 shows how a pupil image is formed in the field-dividing direction in the third embodiment.

FIG. 20 shows a case where the field lens 3 which is set for a center field indicated by a point 9-2 is used also for fields vertically divided as indicated by points 9-1 and 9-3. In this case, the focal length is too short for the fields 9-1 and 9-3. As a result, the projected images of the aperture parts 5-$a1$ and 5-$a2$ (5-$b1$ and 5-$b2$) of the diaphragm 5 are eclipsed and caused to be projected outside of the exit pupil 8 of the objective lens 21.

Figure 21:
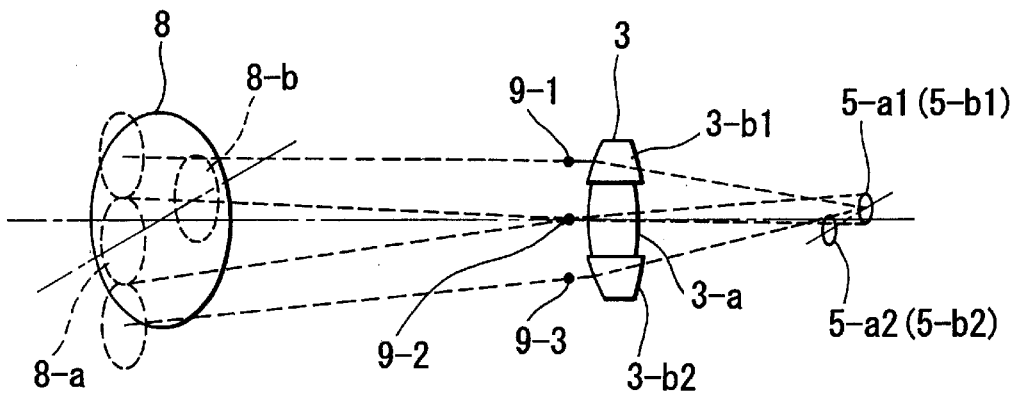
FIG. 21 shows how a pupil image is formed in the field-dividing direction in the third embodiment.

FIG. 21 shows a case where the field lens 3 is divided for different fields, and lens parts 3-$b1$ and 3-$b2$ corresponding to vertically divided fields indicated by points 9-1 and 9-3 are optimized for images projected in the longitudinal direction. For the fields 9-1 and 9-3, however, the focal lengths of the field lens 3 are too long, so that the projected images of the aperture parts 5-$a1$ and 5-$a2$ (5-$b1$ and 5-$b2$) of the diaphragm 5 are eclipsed to be projected outside of the exit pupil 8 of the objective lens 21.

Figure 19:
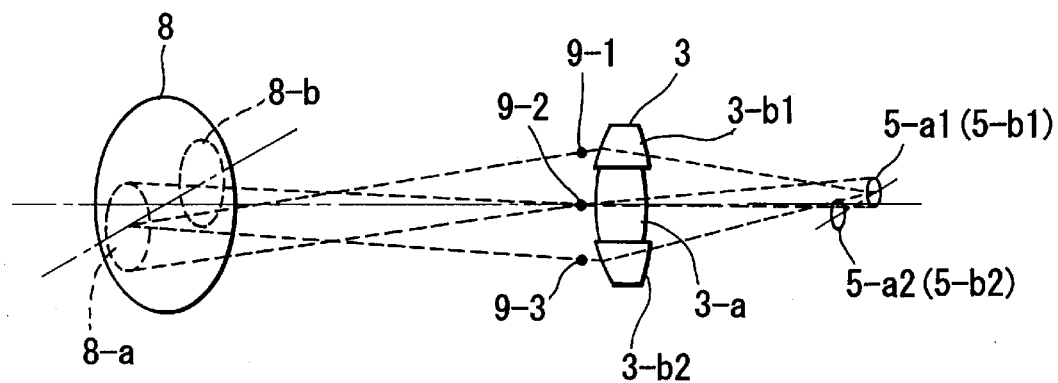
FIG. 19 shows how a pupil image is formed in the field-dividing direction in the third embodiment.

FIG. 19 shows a case where focus detecting areas extending respectively in a direction perpendicular to the paper surface of the drawing are set at points 9-1, 9-2 and 9-3 in the neighborhood of the field lens 3, and the aperture parts 5-$a1$ and 5-$a2$ (5-$b1$ and 5-$b2$) of the diaphragm 5 are used in common for these fields. Assuming that the divided lens parts 3-$a$, 3-$b1$ and 3-$b2$ of the field lens 3 respectively have focal lengths fa, fb1 and fb2, each of the focal lengths fb1 and fb2 is set to be longer than the focal length fa. The optical axes of the lens parts 3-$b1$ and 3-$b2$ having the focal lengths fb1 and fb2 are arranged to be decentered as indicated by points 1-$b1$ and 1-$b2$ in FIG. 12. By this arrangement, projected images in the field dividing direction (vertical direction as viewed in the drawing) and in the longitudinal direction of the field (diaphragm dividing direction) which is perpendicular to the paper surface of the drawing can be adequately projected on the exit pupil 8 of the objective lens 21. This arrangement, therefore, permits adequate focus detection for every field at every image height without causing any eclipse of the pupil.

Figure 22:
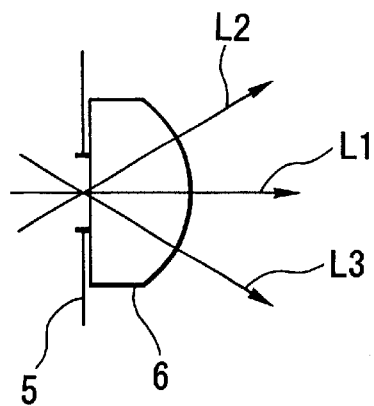
FIG. 22 is an enlarged view of parts around the reimaging lens in the third embodiment.

The actions of the diaphragm 5 and the reimaging lens 6 in the third embodiment are next described. FIG. 22 is an enlarged view showing the diaphragm 5 and the reimaging lens 6.

In FIG. 22, arrows L1, L2 and L3 represent principal rays of light coming from the field areas of the focus detecting areas 2-$a1$, 2-$b1$ and 2-$b2$ shown in FIG. 11 and passing through the center of the diaphragm 5.

In order to have the images of the plurality of focus detecting areas formed on the photo-electric conversion element 7 through the pair of lens parts of the reimaging lens, the third embodiment must be actually arranged to have adequate image forming performance for a wide angle of view. For this purpose, it is effective to satisfy the following condition, with a distance from the center of the diaphragm 5 to the apex of the reimaging lens 6 assumed to be "d", and the radius of curvature of the reimaging lens 6 assumed to be "r":

$$d=r$$

In the case of the third embodiment, the focus detecting areas include the focus detecting area 2-$a2$ which perpendicularly crosses the focus detecting area 2-$a1$, as shown in FIG. 11. The arrangement of the reimaging lens 6 thus becomes as shown in FIGS. 14(A) and 14(B).

Referring to FIGS. 14(A) and 14(B), in order to form the images of the plurality of focus detecting areas on the photo-electric conversion element 7, the lens parts 6-$a1$ and 6-$a2$ of the reimaging lens 6 must be arranged to have a large effective part. If the number of focus detecting areas to be shared by them is only one, an area where a light flux represented, for example, by the principal ray of light L1 shown in FIG. 22 passes becomes the effective part. In the case of the third embodiment, however, not only the area where the principal ray L1 passes but other areas where the principal rays L2 and L3 pass also become effective parts of the reimaging lens 6.

Figure 23:
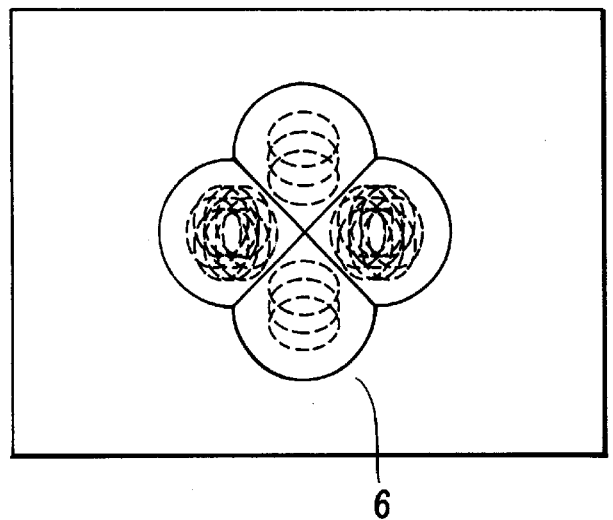
FIG. 23 shows light-flux effective parts of the reimaging lens in the third embodiment.

FIG. 23 shows the light flux passing areas, i.e., the effective areas of the lens parts of the reimaging lens 6 in the third embodiment. Assuming that a distance from the center of the diaphragm 5 to the apex of the reimaging lens 6 is "d", and the radius of curvature of the reimaging lens 6 is "r", the third embodiment is arranged to satisfy the following condition:

$$0.5 < d/r < 0.9$$

In addition, the third embodiment is arranged to prevent overlapping at the reimaging lens 6 by making the length of the upper and lower focus detecting areas 2-$b1$ and 2-$b2$ shorter than the length of the central focus detecting areas 2-$a1$ and 2-$a2$.

Figure 24:
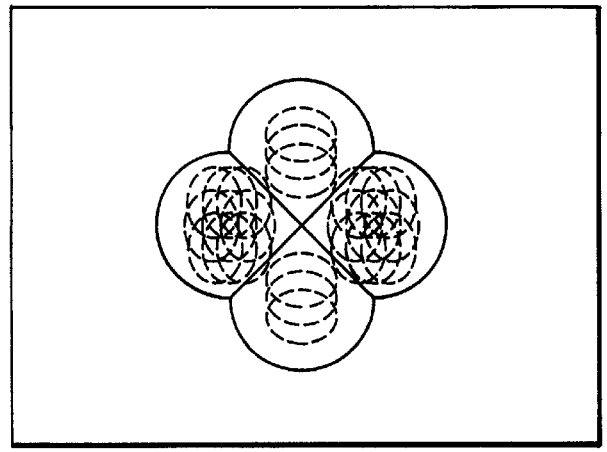
FIG. 24 shows the light-flux effective parts of the reimaging lens for the purpose of explaining a problem.

If the upper limit imposed by the above-stated conditional expression is exceeded, the necessary effective parts would expand to overlap other lens parts as shown in FIG. 24. As a result, light flux parts not passing normal lens parts become stray light. Then, the accuracy of focus detection would be affected by the stray light.

In the third embodiment, the expansion of the effective parts of the reimaging lens 6 is suppressed by making the length of the upper and lower focus detecting areas, which tend to cause overlapping, shorter than the horizontal length of the central focus detecting areas.

If the lower limit imposed by the above-stated conditional expression is exceeded, the adverse effect of comatic aberration would increase to impair an adequate image forming performance. Then, it becomes impossible to accurately carry out focus detection.

Figure 25:
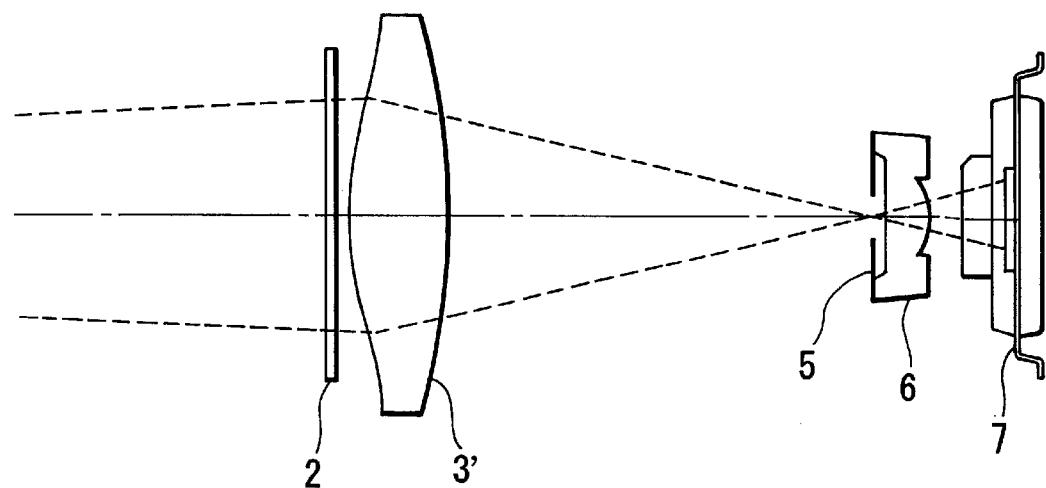
FIG. 25 shows the arrangement of a focus detecting device according to a fourth embodiment of the invention.

FIG. 25 is a sectional view showing a focus detecting device according to a fourth embodiment of the invention. In the fourth embodiment, a field lens 3' is composed of an aspheric lens instead of a divided field lens. Other component elements of the focus detecting device and their actions are the same as those of the third embodiment described above. The aspheric lens employed as the field lens 3' is arranged to have its positive refractive power weaken accordingly as its parts are located closer to its periphery. With the field lens 3' arranged in this manner, the pupil image forming action of the focus detecting system of the fourth embodiment can be adequately accomplished.

Figure 26:
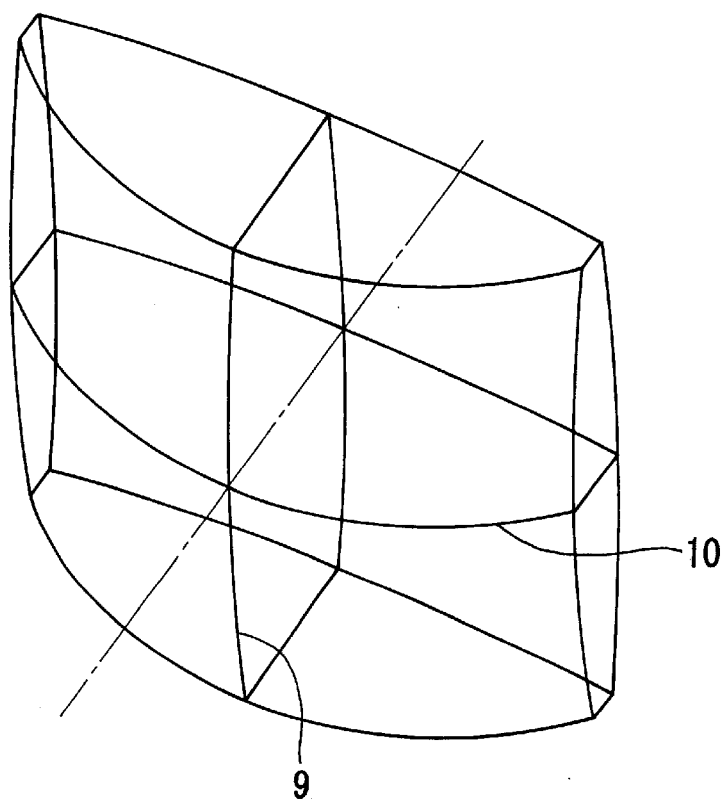
FIG. 26 schematically shows a toric aspheric lens used for the focus detecting device according to the fourth embodiment.

Further, if the field lens 3' is arranged to be a toric aspheric lens which has a refractive power in the generatrix direction different from a refractive power in the meridian direction, as shown in FIG. 26, the pupil image forming action can be more adequately carried out.

FIG. 26 shows the toric aspheric lens which is usable for the fourth embodiment. For the sake of easier understanding, the generatrix 9 and the meridian 10 are schematically shown in FIG. 26. The generatrix 9 is arranged to have a larger radius of curvature than the meridian 10.

With the toric aspheric lens having different radiuses of curvature for the generatrix 9 and the meridian 10 used as the field lens, the arrangement for having a refractive power in the field dividing direction which is vertical as viewed in the drawing set different from a refractive power in the longitudinal direction of the field (diaphragm dividing direction) which is perpendicular to the paper surface of the drawing, as in the field lens shown in FIG. 19, enables the third embodiment to adequately project images on the exit pupil 8 of the objective lens 21.

According to the invention, as described in the foregoing, the focusing states of a plurality of focus detecting areas can be adequately detected by means of the reimaging lens which is composed of a pair of lens parts, so that a highly accurate focus detecting device can be compactly attained.

What is claimed is:

1. A focus detecting device for detecting a focusing state of an objective lens, comprising:

a field lens disposed adjacent to a prescribed image forming plane of the objective lens and having lens surfaces which differ in shape from each other correspondingly with a plurality of focus detecting areas;

a reimaging lens disposed behind said field lens and having a pair of lens parts for forming a pair of light distributions for each of different pupils of the objective lens; and a light receiving sensor arranged to receive the pair of light distributions so as to detect the focusing state of the objective lens, wherein a first area of said field lens has a first field lens part having an optical axis which coincides with an optical axis of the objective lens and having a focal length, and a second area of said field lens which differs from the first area has a second field lens part having an optical axis which does not coincide with the optical axis of said first field lens part and having a focal length, the focal length of said first field lens part differing from the focal length of said second field lens part, said focus detecting device satisfying the following condition:

$$f1 < f2$$

where f1 is the focal length of said first field lens part, and f2 is the focal length of said second field lens part.

2. An optical apparatus, comprising:

a focus detecting device according to claim 1.

3. A focus detecting device for detecting a focusing state of an objective lens, comprising:

a field lens disposed adjacent to a prescribed image forming plane of the objective lens and having lens surfaces which differ in shape from each other correspondingly with a plurality of focus detecting areas;

a reimaging lens disposed behind said field lens and having a pair of lens parts for forming a pair of light distributions for each of different pupils of the objective lens;

a diaphragm disposed on a side of said reimaging lens facing said field lens; and a light receiving sensor arranged to receive the pair of light distributions so as to detect the focusing state of the objective lens, wherein the plurality of focus detecting areas include first and second focus detecting areas which orthogonally intersect each other and a third focus detecting area which is disposed in parallel with and away from the first focus detecting area, said field lens includes a first field lens part which corresponds to the first and second focus detecting areas in common and a second lens part which corresponds to the third focus detecting area, said reimaging lens includes a pair of first lens parts arranged to receive light from the first and third focus detecting areas and a pair of second lens parts arranged to receive light from the second focus detecting area, and a lens surface, on the side of said light receiving sensor, of each of the first lens parts of said reimaging lens has a curved surface convex toward said light receiving sensor, said focus detecting device satisfying the following condition:

$$0.5 < d/r < 0.9$$

where r is a radius of curvature of the convex curved surface of each of the first lens parts of said reimaging lens, and d is a distance between said diaphragm and the convex curved surface.

4. A focus detecting device according to claim 3, wherein an optical axis of said first field lens part does not coincide with an optical axis of said second field lens part.

5. A focus detecting device according to claim 4, wherein the optical axis of said first field lens part coincides with an optical axis of the objective lens.

6. An optical apparatus, comprising:

a focus detecting device according to claim 3.

7. A focus detecting device for detecting a focusing state of an objective lens, comprising:

a field lens disposed adjacent to an image forming plane of the objective lens and having a first field lens part corresponding to a first focus detection area and a second field lens part corresponding to a second focus detection area different from the first focus detection area;

a pair of reimaging lenses disposed behind said field lens and being arranged to receive light from both of said first field lens part and said second field lens part and form a pair of light distributions passing through different areas of a pupil of the objective lens for each of said focus detection areas; and a light receiving sensor which receives the pair of light distributions for each of the focus detection areas formed by said pair of reimaging lens, wherein said focus detection device detects the focusing state of the objective lens on the basis of said pair of light distributions received by said light receiving sensor, and said first field lens part and said second field lens part having a different optical axis.

8. An optical apparatus, comprising:

a focus detecting device according to claim 7.

9. A focus detecting device according to claim 7, wherein said first focus detection area is a central area of a visual field of said objective lens and said second focus detection area is a marginal area of the visual field of said objective lens and the following condition is satisfied:

$$f1 < f2$$

where f1 is the focal length of said first field lens part, and f2 is the focal length of said second field lens part.

10. A focus detecting device according to claim 7, wherein said first focus detection area has an area extending in a predetermined direction and an area extending in a direction vertical to said predetermined direction, and said second focus detection area has an area extending in a predetermined direction.

* * * * *

UNITED STATES PATENT AND TRADEMARK OFFICE
CERTIFICATE OF CORRECTION

PATENT NO. : 6,272,291 B2
DATED : August 7, 2001
INVENTOR(S) : Yusuke Ohmura

It is certified that error appears in the above-identified patent and that said Letters Patent is hereby corrected as shown below:

Column 1,
Line 35, delete "area rranged" and insert -- are arranged --.

Column 3,
Line 14, delete "FIG." and insert -- FIG. 1. --.

Column 6,
Line 40, delete "91," and insert -- 9-1, --.

Column 7,
Line 57, delete "3a" and insert -- 3-a --.

Signed and Sealed this

Fourteenth Day of May, 2002

*Attest:*

JAMES E. ROGAN
*Attesting Officer*    *Director of the United States Patent and Trademark Office*